US009715790B2

(12) United States Patent
Arnone et al.

(10) Patent No.: US 9,715,790 B2
(45) Date of Patent: Jul. 25, 2017

(54) TOURNAMENT MANAGEMENT SYSTEM

(71) Applicant: Gamblit Gaming, LLC, Glendale, CA (US)

(72) Inventors: Miles Arnone, Sherborn, MA (US); Eric Meyerhofer, Pasadena, CA (US); Scott Shimmin, Vista, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 14/708,138

(22) Filed: May 8, 2015

(65) Prior Publication Data

US 2015/0317881 A1 Nov. 5, 2015

Related U.S. Application Data

(63) Continuation of application No. PCT/US2013/064888, filed on Oct. 14, 2013.

(Continued)

(51) Int. Cl.

*A63F 13/00* (2014.01)
*G07F 17/32* (2006.01)

(52) U.S. Cl.

CPC ...... *G07F 17/3276* (2013.01); *G07F 17/3204* (2013.01); *G07F 17/3225* (2013.01); *G07F 17/3258* (2013.01); *G07F 17/3295* (2013.01)

(58) Field of Classification Search

None

See application file for complete search history.

(56) References Cited

U.S. PATENT DOCUMENTS

| | | | |
|---|---|---|---|
| 5,413,357 A | 5/1995 | Schulze et al. | |
| 5,718,429 A | 2/1998 | Keller | |

(Continued)

FOREIGN PATENT DOCUMENTS

| | | | | |
|---|---|---|---|---|
| JP | 2004097610 | | 4/2004 | |
| WO | WO2011109454 | * | 7/2011 | ............ A63F 13/00 |
| WO | 2011/109454 A1 | | 9/2011 | |

OTHER PUBLICATIONS

U.S. Appl. No. 14/185,847 Arnone, et al., filed Feb. 20, 2014.

(Continued)

*Primary Examiner* — Jason Yen

(74) *Attorney, Agent, or Firm* — Caitlyn Ross

(57) ABSTRACT

A tournament management system is disclosed, including a plurality of network distributed processing systems including: a server connected to a controller via a communication link, the server constructed to determine a wagering outcome; a mobile computing device connected to the controller by a network, the mobile computing device constructed to provide an entertainment game outcome; and the controller connected to the mobile computing device by the network and connected to the server by the communication link, the controller constructed to: receive the entertainment game outcome and element utilization information; determine the wagering event; request and receive the wagering outcome; and a tournament manager coupled to the plurality of network distributed processing systems, constructed to: determine a set of tournament players; determine a set of individual prizes; receive updates associated with the set of tournament players; determine a player to win each of the individual prizes.

6 Claims, 19 Drawing Sheets

Related U.S. Application Data

(60) Provisional application No. 61/724,009, filed on Nov. 8, 2012, provisional application No. 61/724,005, filed on Nov. 8, 2012.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 * | 7/2001 | Luciano, Jr. ............ A63F 13/10 273/269 |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,007,358 | B2 * | 8/2011 | Linard ...................... A63F 9/18 463/16 |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,475,266 | B2 | 7/2013 | Arnone |
| 8,480,470 | B2 | 7/2013 | Napolitano et al. |
| 8,622,809 | B1 | 1/2014 | Arora et al. |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 * | 10/2005 | Dixon ................ G07F 17/3267 463/20 |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |

(56) References Cited

U.S. PATENT DOCUMENTS

2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0104960 A1* 4/2009 Kelly .................. G07F 17/3276 463/16
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0213716 A1* 9/2011 Ocko ...................... A63F 13/12 705/304
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wickett
2013/0131848 A1 5/2013 Arnone et al.
2013/0190074 A1 7/2013 Arnone et al.
2013/0260869 A1 10/2013 Basallo et al.
2014/0087801 A1 3/2014 Nicely et al.
2014/0087808 A1 3/2014 Basallo et al.
2014/0087809 A1 3/2014 Leupp et al.

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.

(56) References Cited

OTHER PUBLICATIONS

U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

* cited by examiner

Figure 19
1900
Start
1905
Determine a set of players eligible for tournment
1910
Provide invitations to each of the players in the set to join tournament through ESE
1915
Receive acceptances of invitations and determine participants in tournament
1920
Determine classes of participants in the tournament
1925
Determine prize pool for tournament and/or each class of players in the tournament
1930
Signal start of tournament play
1935
Receive gameplay for each of the participants in the tournament
1940
Award of prizes in prize pool of tournament and/or each class to the participants
1945
Update player records of participants based upon entry fees and awards
end

TOURNAMENT MANAGEMENT SYSTEM

CROSS-REFERENCE TO RELATED APPLICATIONS

This application is a continuation of Patent Cooperation Treaty Application No. PCT/US13/64888, filed Oct. 14, 2013 which claims the benefit of U.S. Provisional Application Nos. 61/724,009, filed Nov. 8, 2012 and 61/724,005 filed Nov. 8, 2012, the disclosures of which are incorporated herein by reference as if set forth herewith. The current application is also related to PCT Applications PCT/US11/26768 filed Mar. 1, 2011, PCT/US11/63587 filed Dec. 6, 2011; PCT/US12/50204 filed Aug. 9, 2012; and PCT/US12/58156, filed Sep. 29, 2012, all of which are incorporated by reference as if set forth herewith.

FIELD OF THE INVENTION

Embodiments of the present invention are generally related to gaming and more specifically to systems and processes that provide a tournament for players of a hybrid game.

BACKGROUND OF THE INVENTION

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a WHO or a PC based.

SUMMARY OF THE INVENTION

A regulated gambling proposition may be executed by a server in a regulated environment. In addition, a mobile computing device executing an entertainment game may operate in an environment separate from the regulated environment. A controller maintains the separation between the server and the mobile computing device and provides an interface between the server and the mobile computing device.

An embodiment of the invention includes a plurality of network distributed processing systems, each network distributed processing system including: a server connected to a controller via a communication link, wherein the server is constructed to determine an outcome of a wagering event; a mobile computing device connected to the controller by a network, wherein the mobile computing device is constructed to execute an entertainment game and provide an entertainment game outcome on the basis of a player's utilization of an entertainment game element during the player's skillful play of the entertainment game; and the controller connected to the mobile computing device by the network and connected to the server by the communication link, wherein the controller is constructed to: receive from the mobile computing device by the network, the entertainment game outcome and information about the player's utilization of the entertainment game element; determine the wagering event based on the player's utilization of the entertainment game element; request from the server via the communication link, the outcome for the wagering event; and receive from the server via the communication link, the outcome of the wagering event; and a tournament manager coupled to the plurality of network distributed processing systems, the tournament manager constructed to: determine a set of players associated with the plurality of network distributed processing systems, the set of players participating in a tournament; determine a prize pool of the tournament that includes a set of individual prizes; receive updates from each of the plurality of network distributed processing systems associated with the set of players participating in the tournament; determine a player of the set of players participating in the tournament to win each of the individual prizes in the prize pool based on the updates; and update player records of each player of the set of players participating in the tournament based on participation in the tournament.

In a further embodiment, the tournament manager is further constructed to determine a set of players eligible for the tournament.

In a further embodiment, the tournament manager is further constructed to: provide an invitation to each player in the set of players determined to be eligible for the tournament; and receive an acceptance of the invitation from each player in the set of eligible players that want to participate in the tournament, wherein an inclusion of a player in the set of players participating in the tournament is based on receiving the acceptance of the invitation.

In a further embodiment, the tournament manager is further constructed to determine a set of classes of players in the set of players participating in the tournament.

In a further embodiment, the tournament manager is further constructed to: determine a prize pool of individual prizes for each class in the set of classes of players of the tournament; and determine a winner of each individual prize in the prize pool in each class from the players in each class.

In a further embodiment, the update includes session metrics.

In a further embodiment, the update is recorded using a vector scheme.

BRIEF DESCRIPTION OF THE DRAWINGS

FIG. 7 illustrates a representative state diagram that illustrates an implementation of a network distributed hybrid game in accordance with embodiments of the invention.

DETAILED DISCLOSURE OF THE INVENTION

Turning now to the drawings, systems and method for providing tournament play for hybrid games in accordance with some embodiments of the invention are illustrated. In accordance with embodiments of the invention, system and methods create and organize tournaments for hybrid games based on controls specified by a casino operator (and/or regulatory authorities). The systems may use skill, player ranking, time played, real currency, or a combination of these and other factors to determine tournament structure.

Game Hybrid Games

Figure 1:
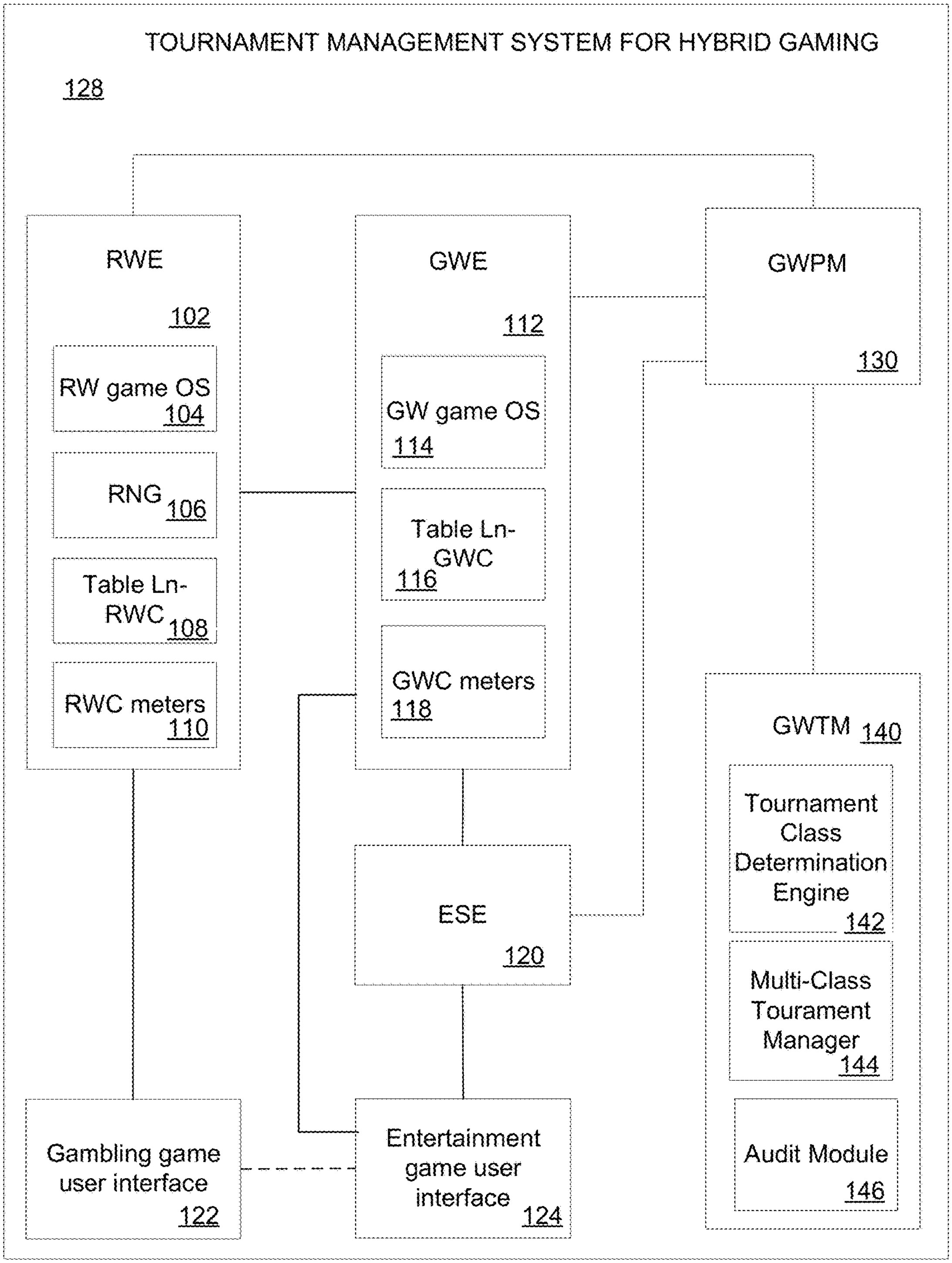
FIG. 1 illustrates a conceptual diagram of components of a hybrid game in accordance with an embodiment of the invention.

In accordance with many embodiments of the invention, a hybrid game integrates high-levels of entertainment content with a game of skill (entertainment game) and a gambling experience with a game of chance (gambling game). A hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such device that provides a random outcome in response to a request. In accordance with some embodiments, the wagering game may be initiated in response to a game object related player action. A hybrid game in accordance with an embodiment of the invention is illustrated in FIG. 1. The hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the hybrid game 128 and controls and operates the gambling game. The operation of a gambling game is enabled by Real World Currency (RWC), such as money or other real world funds. A gambling game can increase or decrease an amount of RWC based on random gambling outcomes, where the gambling proposition of a gambling game is typically regulated by gaming control bodies. In many embodiments, the RWE includes a Real World (RW) operating system (OS) 104, RNG 106, level n real-world credit pay tables (table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (table Ln-RWC) 108 is a table that can be used in conjunction with a random number generator (RNG) 106 to dictate the RWC earned as a function of sponsored gameplay and is analogous to the pay tables used in a conventional slot machine. Table Ln-RWC payouts are independent of player skill. There can be one table or multiple tables included in Ln-RWC pay tables 108 contained in a gambling game, the selection of which can be determined by factors including (but not limited to) game progress that a player has earned, and/or bonus rounds for which a player can be eligible. RWCs are credits analogous to slot machine game credits, which are entered into a gambling game by the user, either in the form of money such as hard currency or electronic funds. RWCs can be decremented or augmented based on the outcome of a random number generator according to the table Ln-RWC real world credits pay table 108, independent of player skill. In certain embodiments, an amount of RWC can be used as criteria in order to enter higher ESE game levels. RWC can be carried forward to higher game levels or paid out if a cash out is opted for by a player. The amount of RWC used to enter a specific level of the game level n need not be the same for each level.

In accordance with some embodiments of the invention, the GWE 112 manages the overall hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an operating system (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of the invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a draw certificate based hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a hybrid game integrates a video game style gambling machine, where the gambling game (including an RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the hybrid game can leverage very popular titles with gamers and provides a sea change environment for casinos to attract players with games that are more akin to the type of entertainment that a younger generation desires. In accordance with various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
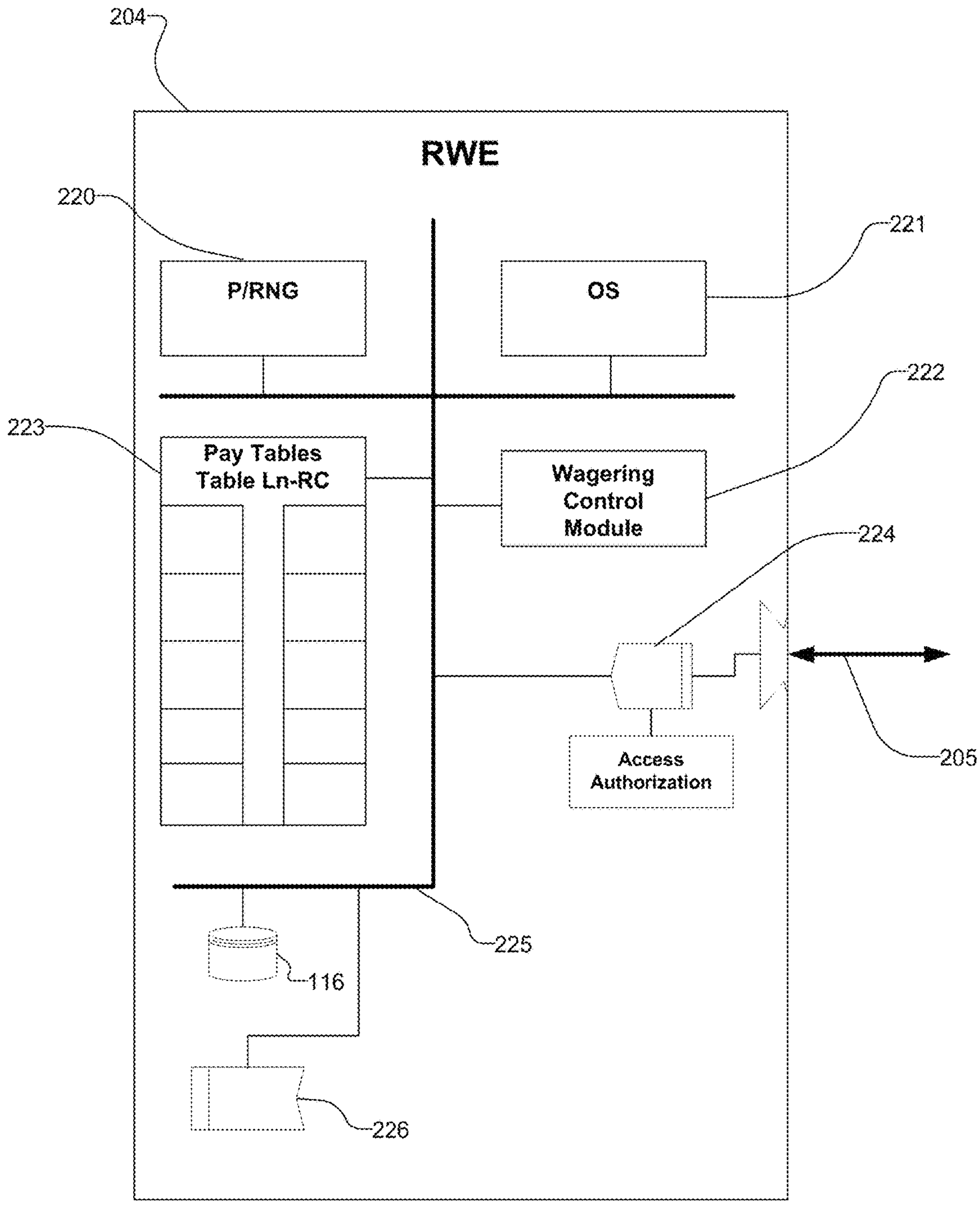
FIG. 2 illustrates a conceptual diagram of aspects of a Real World Engine (RWE) of a hybrid game in accordance with some embodiments of the invention.

The components provided by the RWE for a hybrid game in accordance with embodiments of the invention are shown in FIG. 2. In accordance with embodiments of the invention, the RWE 204 includes an internal bus 225 that connects an operating system OS 221, a pseudo random or random number generator ("P/RNG") 220, one or more pay tables (Table Ln-RC) 223 which would control the functions of the RWE, a P/RNG 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
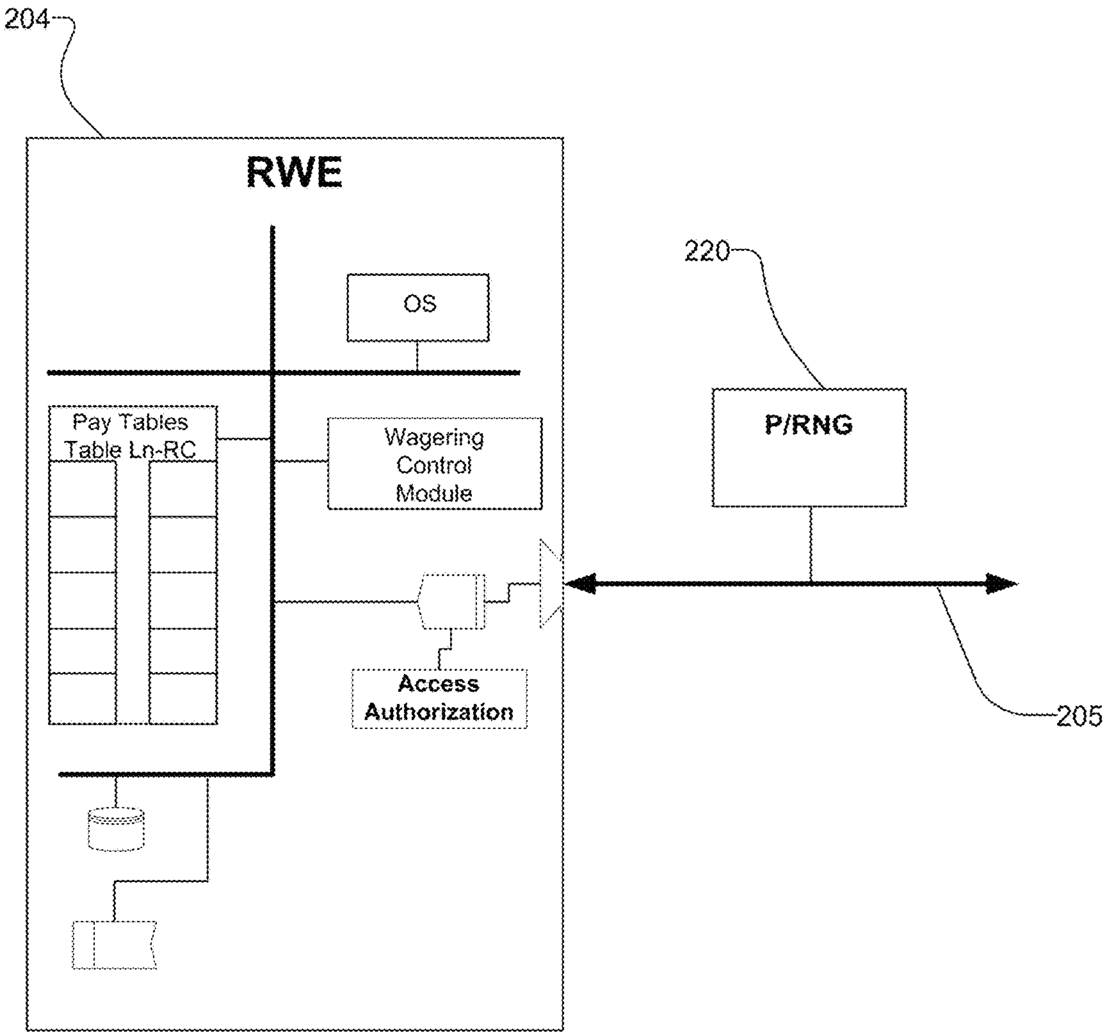
FIG. 3 illustrates a conceptual diagram of aspects of a Real World Engine of a hybrid game in accordance with some other embodiments of the invention.

In some embodiments, the RWE communicates with external systems to provide various functions of a hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the P/RNG 220 which is an external system connected to the RWE 204 by the internet 205 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the shown embodiments. However, any of the components could be external systems without departing from this invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
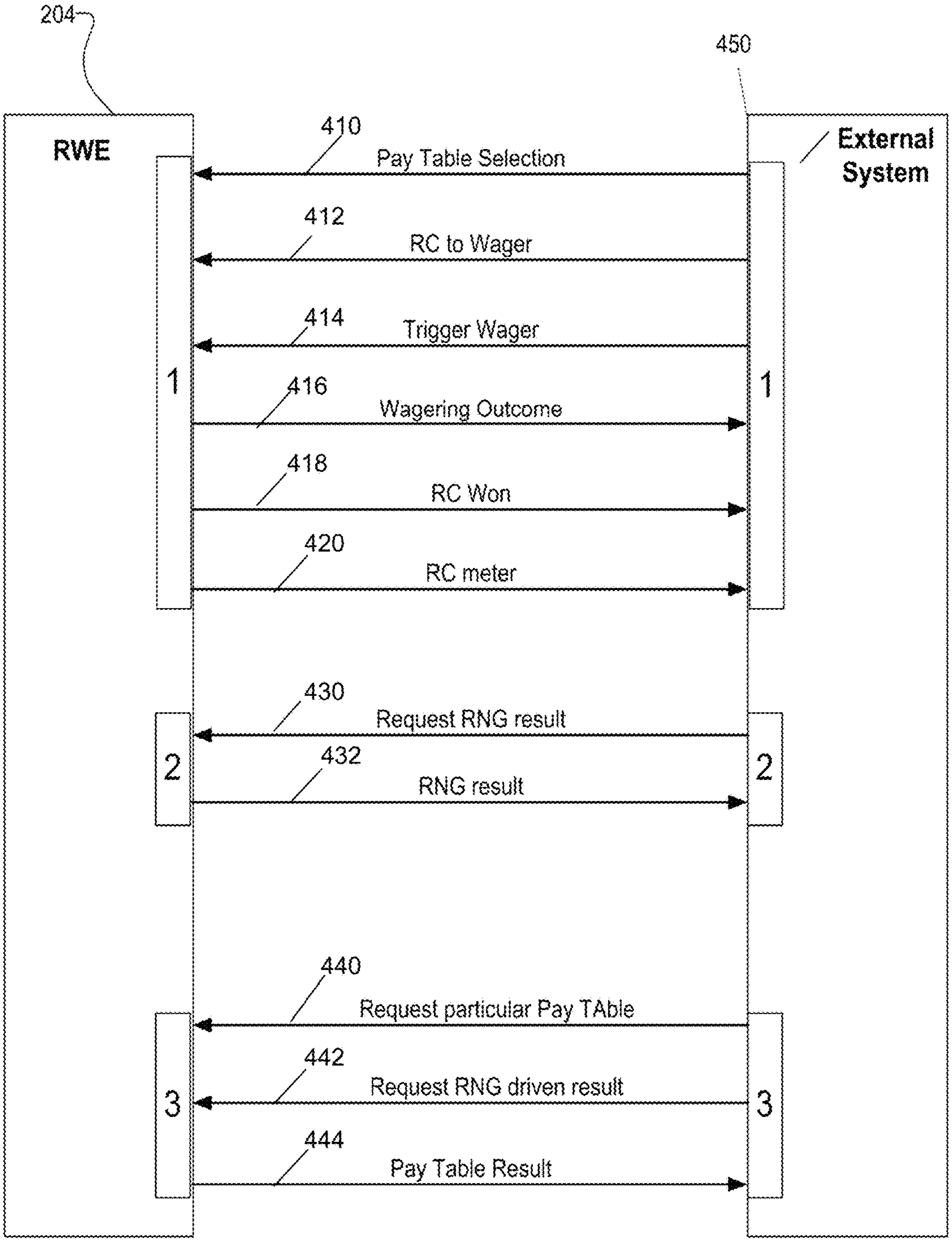
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an RNG result support from the RWE 204. In this exchange, the external system 450 requests an RNG result from the RWE 204 (430). The RWE 204 returns an RNG result to the external 450 in response to the request (432). The result may be generated as a function of the internal RNG in the RWE 204, or from an RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling an RNG result to a particular Pay Table contained in the RWE 204. In this exchange, the external system 450 instructs the RWE as to the pay table (Table Ln-RC) to use 450. The external system then requests a result whereby the RNG result is coupled to the requested Pay Table (442). The result is returned to the external system 405 by RWE 204 (444). Such an aspect is different from the first exchange shown by the box"1" sequence in that no actual RC wager is conducted. However, such a process t might be useful in coupling certain non-RC wagering entertainment game behaviors and propositions to the same final resultant wagering return which is understood for the hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from this invention.

Figure 5:
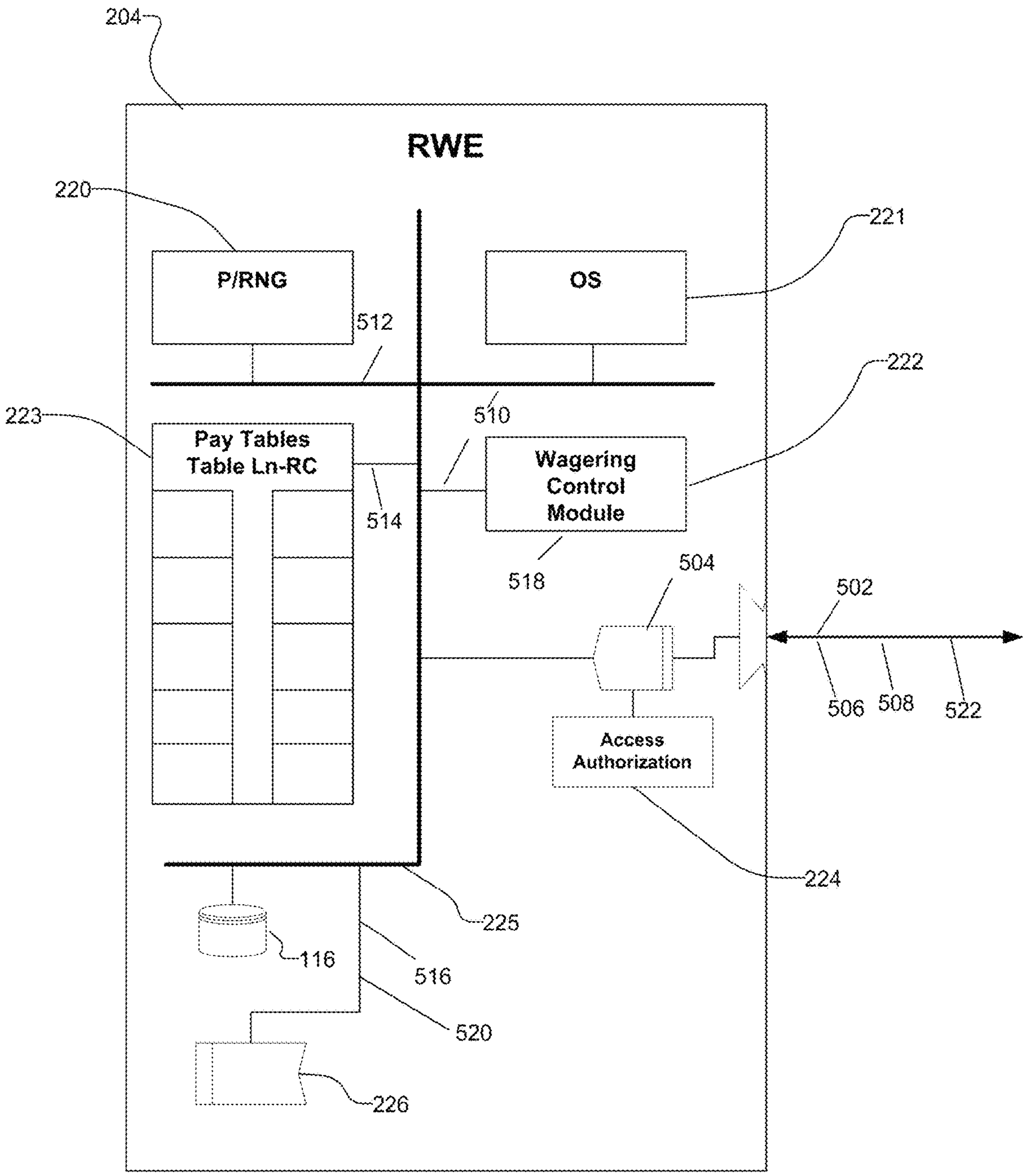
FIG. 5 illustrates a conceptual diagram of a process flow and signaling in an RWE to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204. The Access Authorization Module determines that the external system authorized to connect to RWE 204 (504) and transmits an authorization response to the external system. The external systems that provide requests a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests an RNG result from the RNG 220 (512); retrieves a proper pay table or tables from the pay tables 223 (514); adjusts the RC of the player in the RC repository 926 as instructed (516; applies the RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
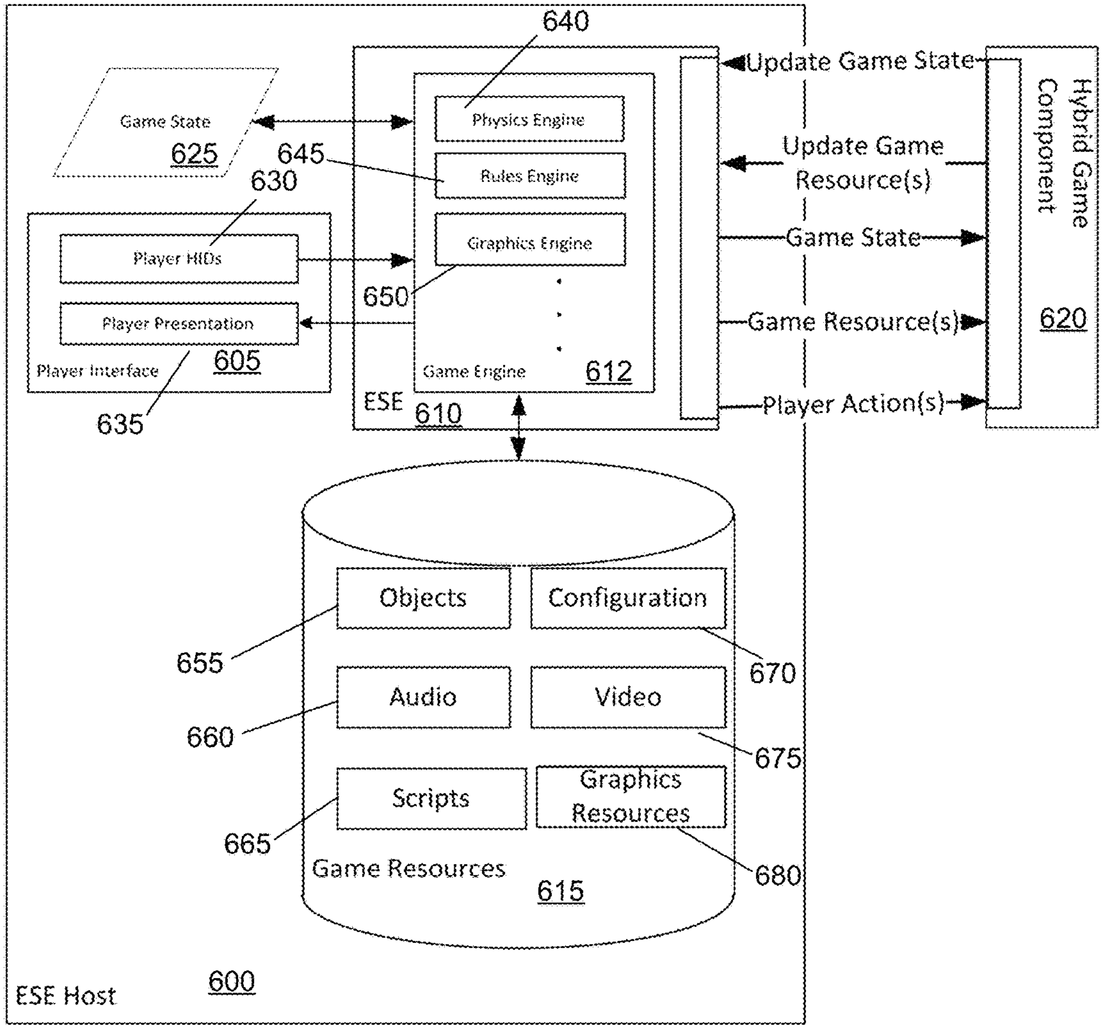
FIG. 6 illustrates a conceptual diagram of aspects of an Entertainment System Engine in accordance with embodiments of the invention.

A block diagram of components an ESE being provided by an ESE host for a hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game.

Components of the game engine include a physics engine 640 used to simulate physical interactions between virtual objects in the game state, a rules engine 645 for implementing the rules of the game, an RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

The ESE 610 provides one or more interfaces between an entertainment game and other components 620 of a hybrid game, such as a GWE. The ESE 610 and the other hybrid game component 620 communicate with each other using the interfaces, such as by passing various types of data and sending and receiving messages, status information, commands and the like. Examples of communications include, but are not limited to, requesting by the hybrid game component 620 that the ESE 610 update the game state using information provided by the other component; requesting, by the hybrid game component 620, that the ESE 610 update one or more game resources using information provided by the hybrid game component 620; the ESE 610 providing all or a portion of the game state; the ESE 610 providing one or more of the game resources to the hybrid game component 620; and the ESE 610 communicating player actions to the other hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which has real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos.

PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
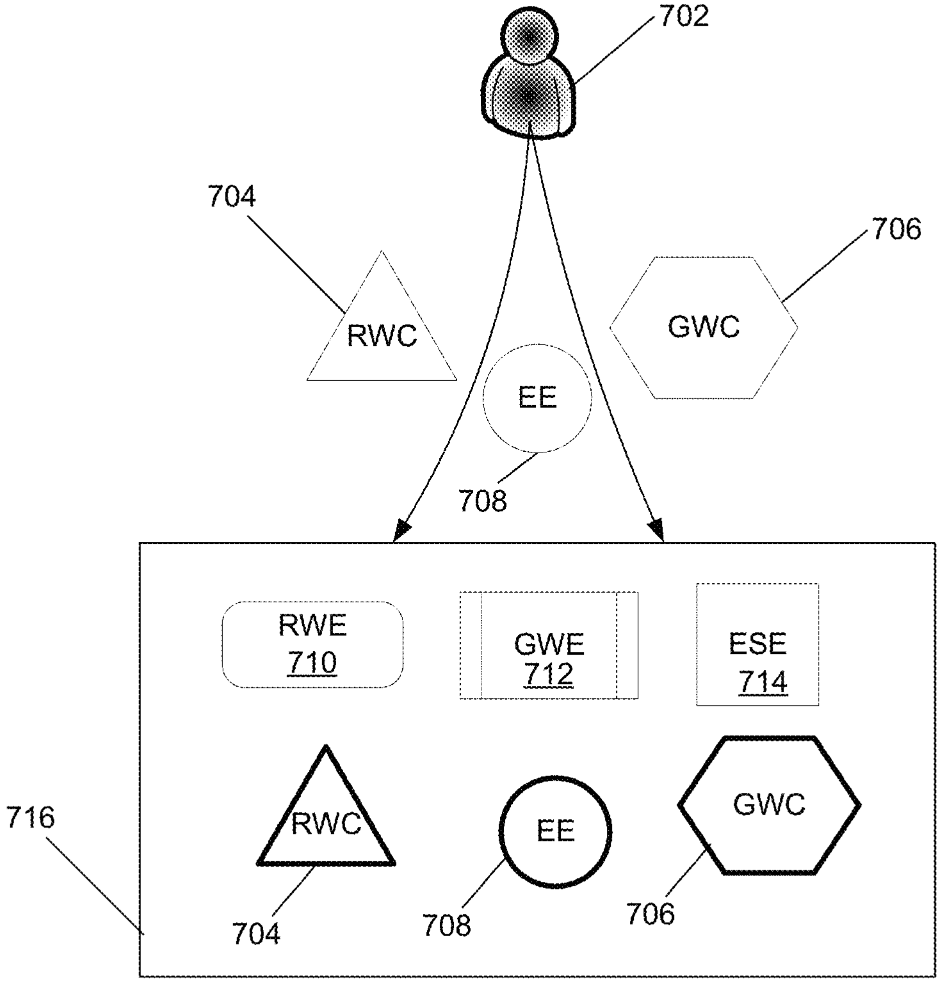
FIG. 7 illustrates a conceptual diagram of interactions between a user and a hybrid games in accordance with embodiments of the invention.

In accordance with some embodiments, a player can interact with a hybrid game by using RWC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RWC and entertainment game elements, such as but not limited to enabling elements (EE), are utilized in a hybrid game in accordance with an embodiment of the invention is illustrated in FIG. 7. The conceptual diagram illustrates that RWC 704, EE 708 and GWC 706 can be utilized by a player 702 in interactions with the RWE 710, GWE 712 and ESE 714 of a based hybrid game 716. The contribution of elements, such as EE 708, can be linked to a player's access to credits, such as RWC 704 or GWC 706. Electronic receipt of these credits can come via a smart card, voucher or other portable media, or as received over a network from a server. In accordance with certain embodiments, these credits can be drawn on demand from a player profile located in a database locally on a hybrid game or in a remote server.

Various types of hybrid games and triggering mechanisms are described in PCT Applications PCT/US11/26768 filed Mar. 1, 2011, PCT/US11/63587 filed Dec. 6, 2011; and PCT/US12/50204 filed Aug. 9, 2012, all of which are incorporated by reference as if set forth herewith.

Figure 8:
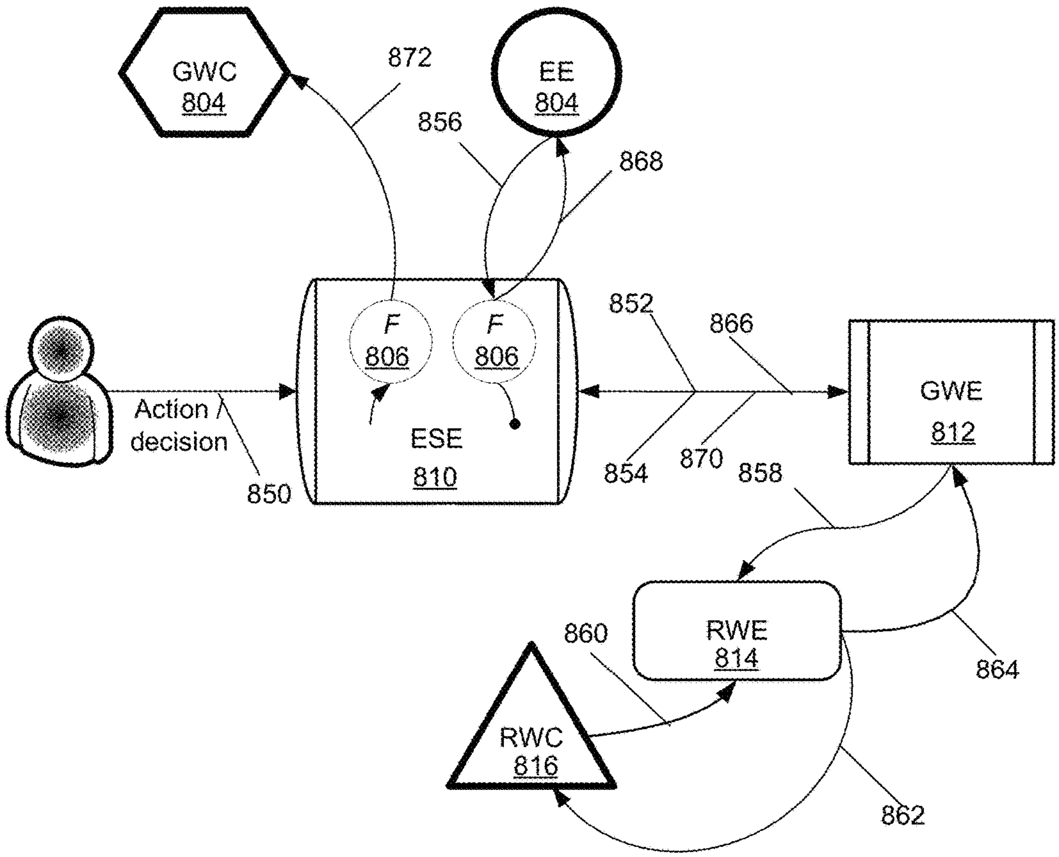
FIG. 8 illustrates conceptual diagram that illustrates the interplay between aspects of a hybrid game in accordance with some embodiments of the invention using Real World Currency (RWC).

A conceptual diagram that illustrates the interplay between aspects of a hybrid game in accordance with an embodiment of the invention using Real World Currency (RWC) is illustrated in FIG. 8. Similar to FIG. 7, a player's actions and/or decisions can affect functions 806 that consume and/or accumulate GWC 802 and/or entertainment game elements, such as but not limited to EE 804, in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RWC 816 in a gambling game executed by the RWE 814.

In accordance with some embodiments of the invention, the following may occur during use of the hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a hybrid game, but is not intended to be exhaustive and only lists only one of numerous possibilities of how a hybrid game may be configured to manage its fundamental credits.

Figure 9:
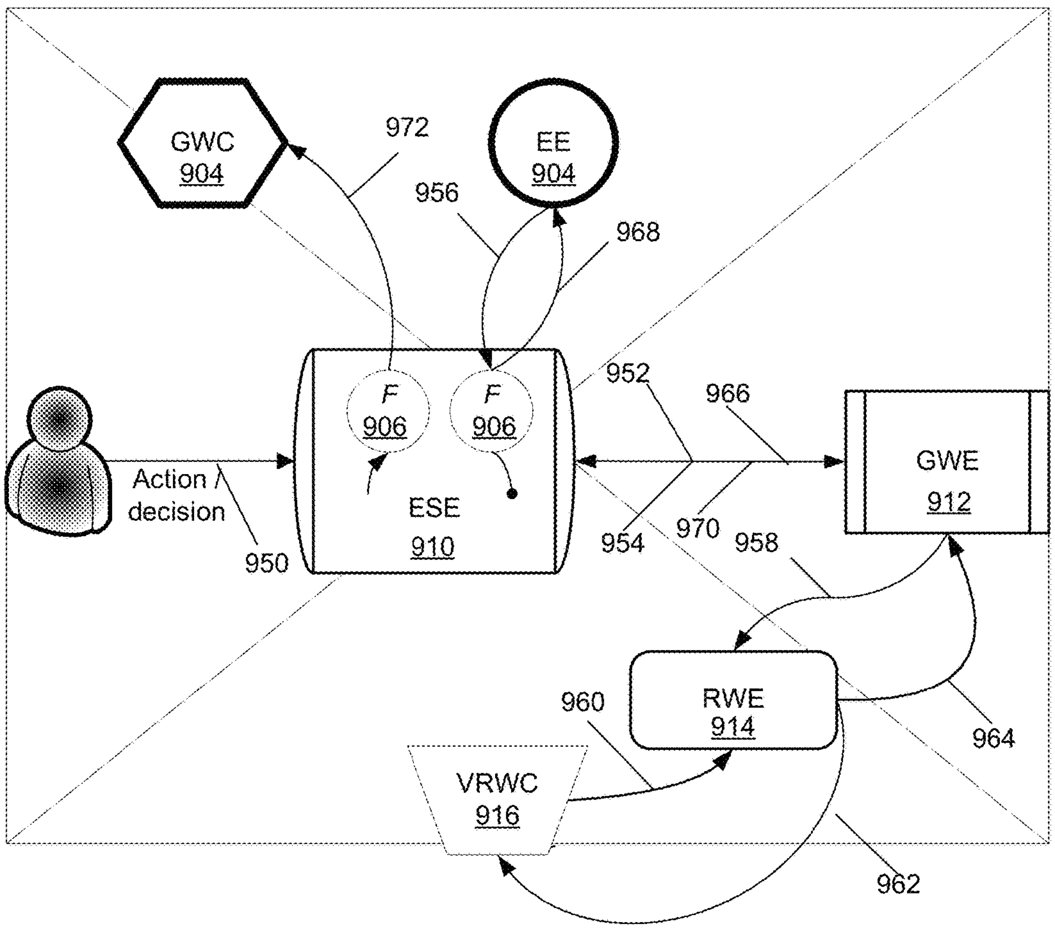
FIG. 9 illustrates conceptual diagram that illustrates the interplay between aspects of a hybrid game in accordance with other embodiments of the invention using Virtual Real World Currency (VRWC).

A conceptual diagram that illustrates the interplay between aspects of a hybrid game in accordance with an embodiment of the invention using Virtual Real World Currency (VRWC) is illustrated in FIG. 9. As seen in the FIG. 9, substituting VRWC in place of RWC is effected without impact to the architecture or operation of the Hybrid Game. The implementation of FIG. 9 is not the only embodiment using virtual currency within a Hybrid Game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to an RWE 914. Unlike the process shown in FIG. 8, RWE 914 triggers a wager of Virtual Real World Currency (VRWC) 916 in a gambling game executed by the RWE 914.

For purposes of this discussion, VRWC can be thought of as a form of alternate currency, which can be acquired, purchased or transferred, in unit or in bulk, by/to a player, but does not necessarily directly correlate to RWC or real currency. As an example, there is a virtual currency called "Triax Jacks", 1000 units of which are given to a player by an operator of a hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the hybrid game that Triax Jacks would be wagered in place of RWC, such that the hybrid game could be played for free, or with played with operator sponsored Triax Jacks.

Returning to the process in FIG. 9, the following may occur during use of the hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Hybrid Game

Figure 10:
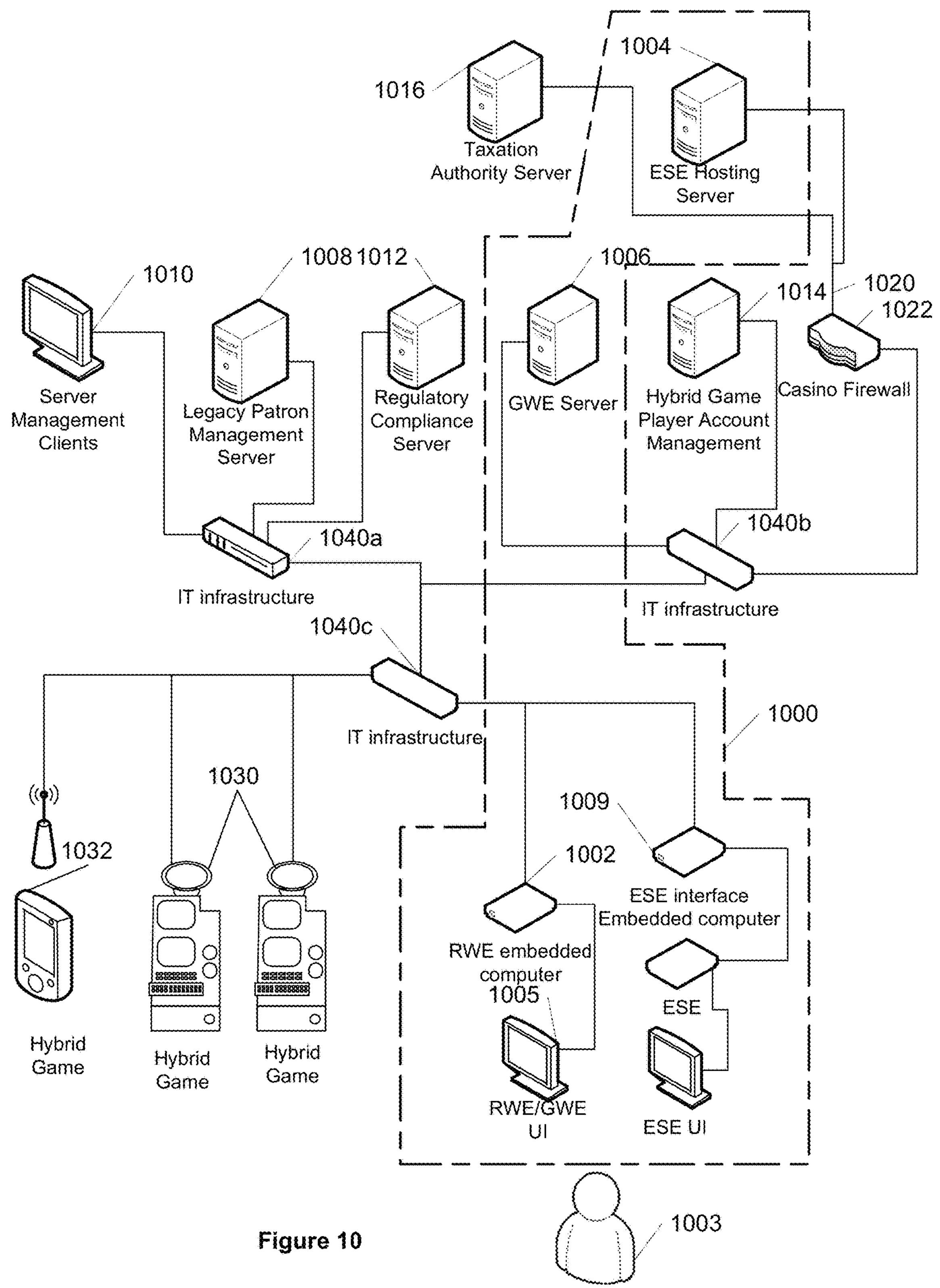
FIG. 10 illustrates a system diagram of an implementation of a network based hybrid game in accordance with another embodiment of the invention.

FIG. 10 is a diagram showing an implementation of a hybrid game in a casino in accordance with an exemplary embodiment. In the figure, the hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which a hybrid game 1000 might be inevitably be connected, and indeed one might expect there would be others, but rather provides an example of a set of a sub-set of systems which would be present in an exemplary embodiment of an installation.

Figure 11:
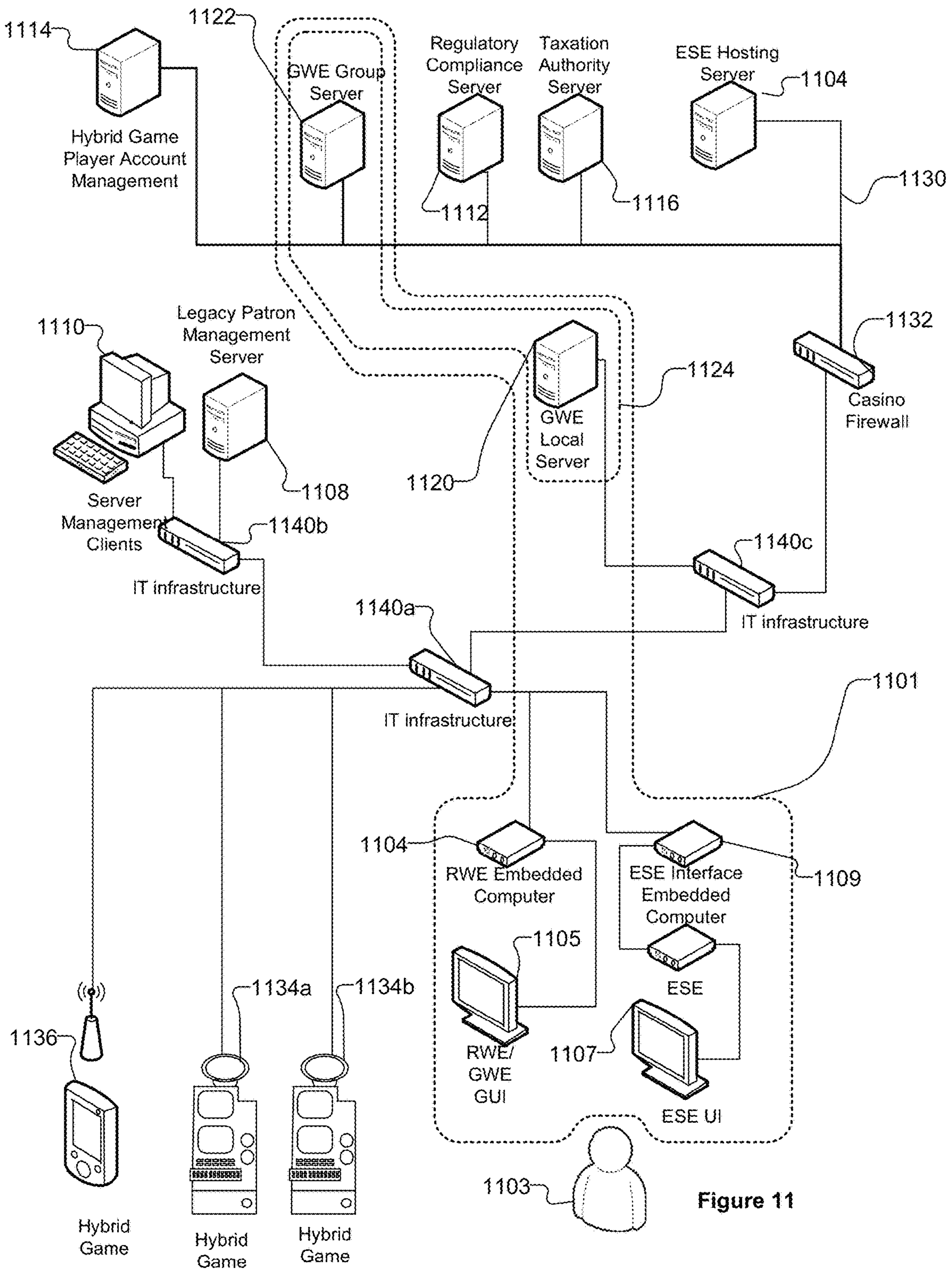
FIG. 11 illustrates a system diagram of an implementation of an Internet based hybrid game in accordance with an embodiment of the invention.

FIG. 11 is a diagram showing another implementation of a hybrid game in accordance with an exemplary embodiment. In the figure, the hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122. (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded hybrid game components via communications network such as the Internet 1130 through a firewall 1132. FIG. 11 also illustrates various other systems, which may reside outside the bounds of the casino and are connected to the framework via communications network. The end devices utilized for user interfaces for a hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which a hybrid game might be inevitably be connected, and indeed one might expect there would be others, but rather provides an example of a set of a sub-set of systems which would be present in an exemplary embodiment of an installation.

Figure 12:
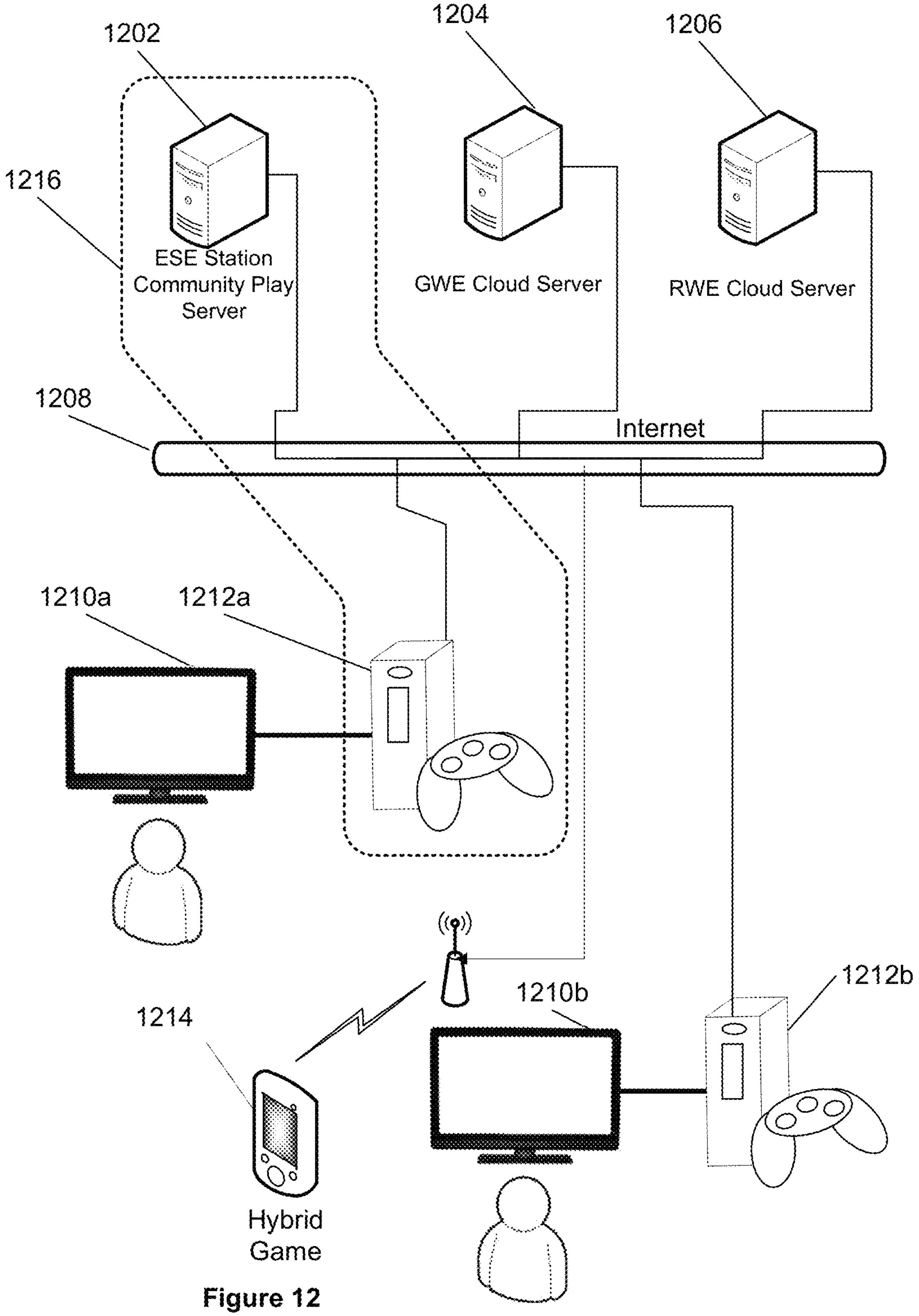
FIG. 12 illustrates a system diagram of an implementation of a cloud based hybrid game in accordance with embodiments of the invention.

A system diagram that illustrates an implementation of network a cloud based hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touch-screen or PDA) of hybrid games over the Internet 1208. Each gambling hybrid game includes a local ESE 1212*a* or 1212*b* (such as, but not limited to, a video game console or a gaming computer system) that interfaces with a remote ESE server 1002. Processes performed by an ESE 1212*a* services can be performed in multiple locations, such as, but not limited to, remotely on an ESE server 1202 and locally on a local ESE 1212*a*. In addition, a gambling hybrid game may include a Personal Digital Assistant (PDA) 1214 or other type of mobile computing device game coupled to the ESE hosting server 1202, thus providing the opportunity for a player to play a hybrid game on the PDA through a mobile phone or data network.

There are many possible permutations of how a hybrid game could be constructed, with FIGS. 10, 11 and 12 showing only three possible permutations and provided as examples, which are not intended to suggest limitations to the forms of the architecture. Other embodiments include a version where the entire hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
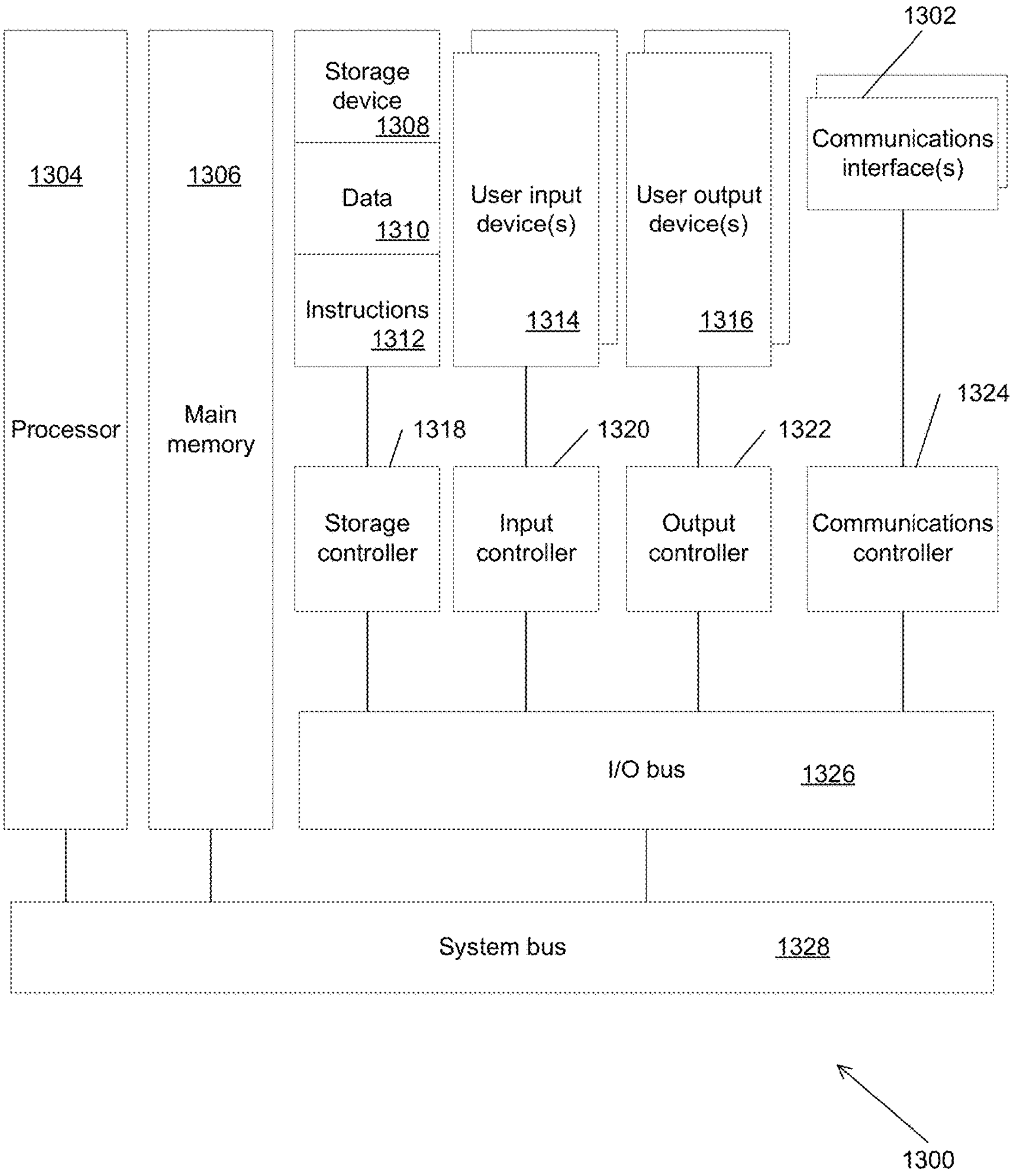
FIG. 13 illustrates a block diagram of components of a device implementing a hybrid game in accordance with an embodiment of the invention.

Any of a variety of processing apparatuses can host various components of a hybrid game in accordance with embodiments of the invention. In accordance with embodiments of the invention, these processing apparatuses can include, but are not limited to, a gaming machine, a general purpose computer, a computing device and/or a controller. A processing apparatus that is constructed to implement a hybrid game in accordance with embodiments of the invention is illustrated in FIG. 13. In the processing apparatus 1300, a processor 1304 is coupled to a memory 1306 by a bus 1328. The processor 1304 is also coupled to non-transitory processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a hybrid game. The processor 1304 can utilize various input and output devices in accordance with the instructions and the data in order to create and operate user interfaces for players or operators of a hybrid game (such as but not limited to a casino that hosts the hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices.

Provision of Tournament Play for Gambling Hybrdi

Figure 14:
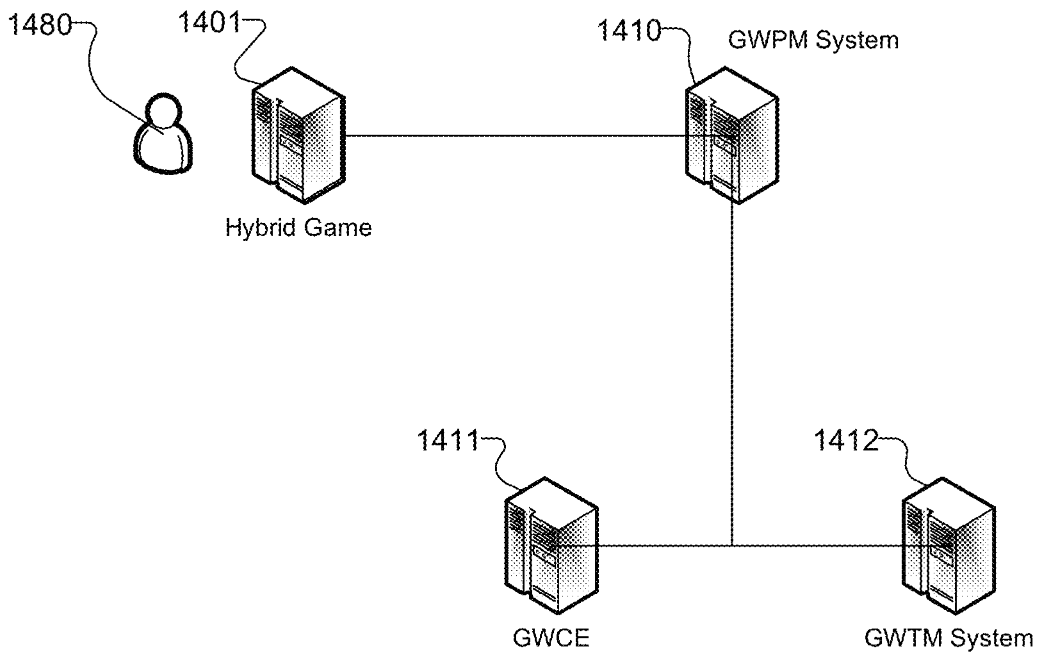
FIG. 14 illustrates a system diagram of components in a system that provides tournaments for hybrid games in accordance with embodiments of the invention.

In accordance with many embodiments of the invention, a hybrid game allows a player to participate in a tournament during play of the hybrid game. In accordance with these embodiments, the game world engine may be provided by one or more different systems that perform the process that allow for tournament play. A system diagram showing functional aspects of a hybrid game with a tournament mode in accordance with embodiments of the invention is shown in FIG. 14. The system shown in FIG. 14 includes a device providing a Hybrid game ("HyG") 1401, a Game World Player Management System (GWPM) 1410, a Game World Credit Exchange ("GWCE") 1411, and a Game World Tournament Management System ("GWTM") 1412. The HyG 1401 is a hybrid game provided by a processing apparatus to a user 1480 and is connected to the GWPM 1410. The HyG 1401 and the GWPM 1410 interchange information to provide the hybrid game including, but not limited to, player identity(s); player account information; player metrics related to skill and accumulated skill points or GWC (as discussed below); RC contribution to tournament prize pool (as discussed below); player rankings; player preferences; and time spent playing the game. The GWPM 1412 stores and manages a broad array of data related to a player's life within the hybrid game ecosystem.

GWPM 1410 connected to the GWCE 1411 and GWTM 1412. The GWCE 1411 performs exchange of a player's GWC credits from one type of hybrid game (e.g. word game or 1st person shooter game) into GWC of another type of hybrid game. The following is a formula to conceptualize this concept:

$$GWC_A \rightarrow GWC_B.$$

Where $GWC_A$ is credits in a first type of hybrid game, game A (for example bullets in a first person shooter game); and $GWC_B$ is credits in a second type of hybrid game, game B (for example, fuel in a car racing game) via the GWCE 1411.

The GWCE 111 may also perform conversion of GWC from a particular game into a universal currency ("UGWC") which could be used in the hybrid game system for another purpose. The following is a formula to conceptualize this concept:

$$GWC_A \rightarrow UGWC$$

Where $GWC_A$ is credits in a first type of hybrid game, game A (for example bullets in a first person shooter game); and UGWC are the universal currency.

The GWPM 1410 also connects to the Game World Tournament Management ("GWTM") System 1412. The purpose of the GWTM is to arrange and manage player head to head types and player against computer types of tournaments.

Figure 15:
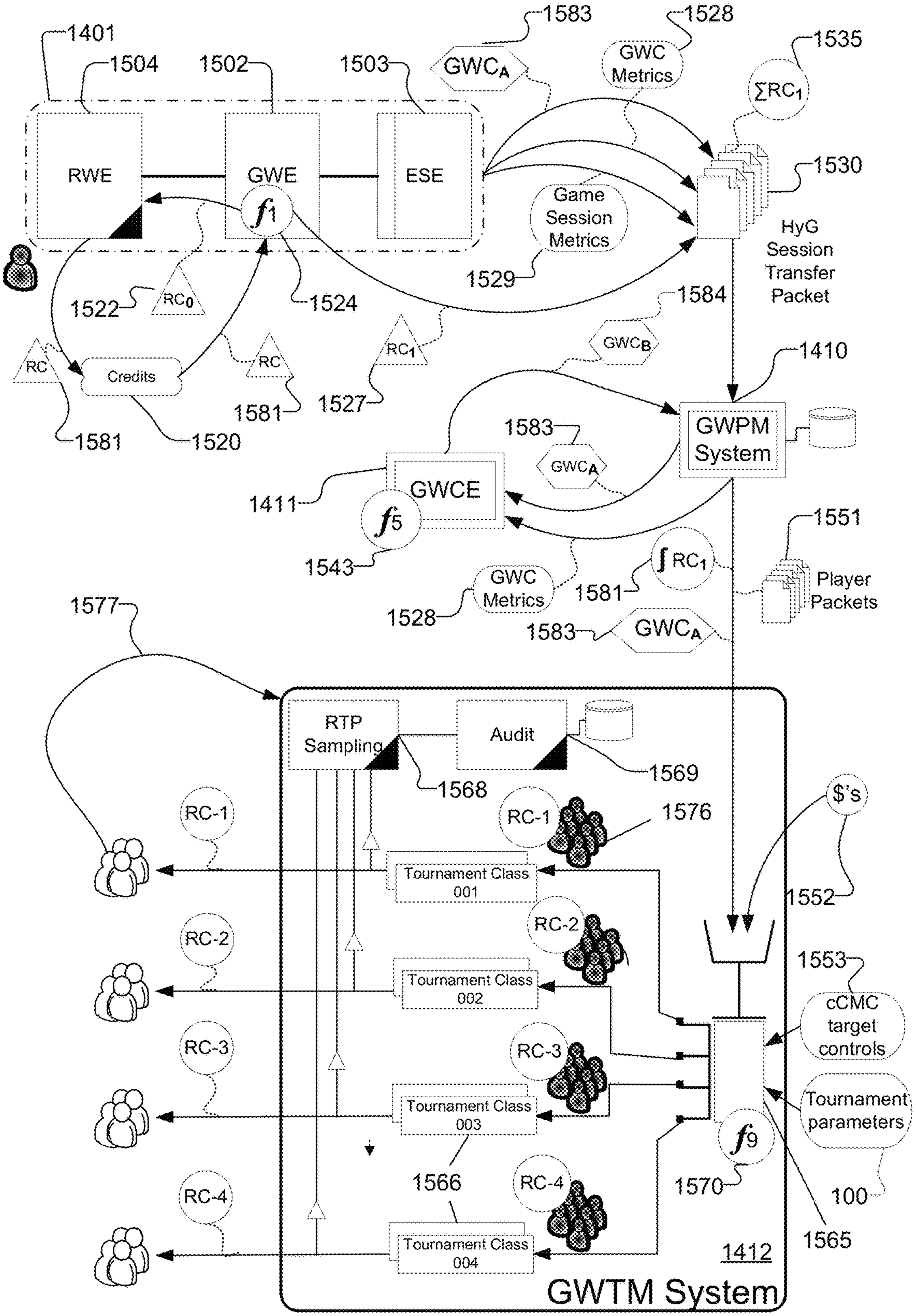
FIG. 15 illustrates a conceptual diagram of systems and processes for providing tournament play in hybrid games in accordance with embodiments of the invention.

A conceptual process flow diagram for providing a tournament mode for a hybrid gambling game in accordance with embodiments of the invention is shown by FIG. 15. FIG. 15 provides more detail of the workings of each of HyG 1401, the GWPM 110, the GWCE 111 and the GWTM 112 and the interactions between these systems. HyG 1401 provides the hybrid game elements of the RWE 1504, the GWE 1502 and the ESE 1503. A player plays the HyG 1401 by primarily interacting with the ESE 1503, resulting in wagers funded by the player's credits RC 1581 which are recorded by a RC credit meter 1520. When wagers of RC 1581 are made, the wagers are segmented into two portions by GWE function [*f*1] 1524. In accordance with some embodiments of the invention, GWE function [*f*1] 1524 controls the amount of $RC_1$ 1527 credits which are effectively taken from a player's wager of RC 1581 at the time the wager is placed with the RWE 1504 and contributed to a pool for a tournament. The GWE function [*f*1] is expressed as:

$$RC \rightarrow \{GWE\ function[f1]\} \rightarrow RC_1, RC_2$$

Where GWE function [*f*1] 1524 is applied to RC wager to yields $RC_1$ and $RC_0$. GWE function [*f*1] 1524 may be a fixed percentage of the RC wagered, a variable coefficient based on the size of the wager, a variable coefficient based on the amount of a player's GWC or the player efficiency at earning GWC vs. the amount of RC wagered, etc. Furthermore GWE function [*f*1] 1524 may be under the control of casino operators, business partners, regulators or a combination of the three.

After the portions are determined, the first portion, $RC_0$ 1522 is passed to the RWE 1504 for execution of the wager on a gambling event in the hybrid gambling game. The second portion, $RC_1$ 1527, is contributed to a pool for later use. The player's $RC_1$ contributed to the pool is logged and accumulated in a Hybrid game Session Transfer Packet ("gSTP") 1530, the total of which is denoted by the object 1535. One skilled in the art will note that that the gSTP packet 1530 may be communicated from HyG 1401 to the GWPM 1410 system either real time, communicated at the end of the session or hybrids thereof.

The ESE 1503 also logs Game Session Metrics 1529 related to the session into the gSTP 130. These Game Session Metrics might include data such as, but not limited to:

i) a tracking record for the game session that allows various game events and actions to be recorded against a game progress reference method (such as virtual or real game time elapsed, game action opportunities, game wagering events, etc.). This tracking record shall be referred to as the "HyG.seq.record" in this document;

ii) a special game objects in use in the ESE game during the session (e.g. a special sword, a particular weapon, a potion, etc.);

iii) the impact of special objects in use to the rate at which a player accumulates GWC 1583;

iv) the record of RC 1581 wagered and the amount of contributed $RC_1$ 1527 against a tracking record of the use of ESE game modifying objects (such as the special game objects cited above) in such a manner as to allow inspection and analysis (by computer, human or both) of the play session to profile how RC wagering and contribution were impacted by the use of the ESE game modifying objects; and v) an entry or marker into the HyG.seq.record when certain game objects were used, or key wagering or game context decisions or actions were taken.

The ESE 1503 logs GWC 1583 earned by the player during a gameplay session into the gSTP 1530, along with various other GWC Metrics 1528 related to the profile of the player's accumulation of the GWC 1583 during the gameplay session and how the gameplay session has progressed resulting in GWC earned. The gameplay session GWC Metrics might include data such as, but not limited to:

i) the amount of RC 1581 wagered to earn the amount of GWC 983 in the session;

ii) the amount of RC 1581 won to earn the amount of GWC 1583 in the session;

iii) the amount of RC 1581 lost to earn the amount of GWC 1583 in the session;

iv) a record of RC 1581 wagered and the amount of contributed $RC_1$ 1527 against a tracking record of ESE activity (such as wagering triggering gambling events and/or action elements of an entertainment game) in such a manner as to allow inspection and analysis (by computer, human or both) of the play session to profile how GWC 1583 was earned during the session; and v) an entry or marker into the HyG.seq.record when GWC 1583 was earned and when RC 1581 was wagered, won and/or lost, and the $RC_1$ 1527 contributed at these points.

As seen in FIG. 15, the HyG 1401 is coupled to the GWPM 110 system, and as described above, the HyG 1401 communicates the gSTP 130 packet to the GWPM for various uses, including but not limited to play session vaulting, accounting, providing a repository for a player account for persistent GWC 1583, for use by the GWTM 1412 (see discussion below), for regulatory purposes and for player marketing uses by the operator to name a few potential applications of the GWPM.

The GWPM 1410 coupled to the GWCE 1411. The GWCE 1411 performs the process of converting GWC 1583 earned on one game platform to GWC usable in another (or, as described above, into UGWC for other uses or for housing player GWC in a "common currency"). The conversion is performed by GWCE function [*f*5] 1543. The GWCE function 1543 may be performed by various formulae and algorithms in order to affect the exchange in a fair and accountable manner. For example, GWC from game A, denoted as $GWC_A$ 1583, and GWC metrics 1528 from game A (which relates to the efficiency with which a player earned the GWC on the game) is passed from the GWPM 1410 to the GWCE 1411, where it is converted by GWCE function [*f*5] 1543 into GWC usable within game B, denoted as $GWC_B$ 1584. Presumably, GWPM 1411 stores $GWC_A$; $GWC_B$; UGWC units; or permutations of UGWC and various GWC species in a player account.

In the hybrid game ecosystem, a tournament is a method by which player accumulated GWC affords a player an opportunity to attain something of real value for the GWC 1583 game points (or skill points as they can be thought of). Under this model, GWC, in the form of the appropriate species, is paid as an entry fee to the tournament which allows a player to compete for awards and prizes, which may be RC 1581, cash, prizes, goods, services, etc. Organizing, managing, and executing tournaments are performed by the GWTM 1412. The tournaments may be either head to head or player vs. computer play. The GWTM 1412 communicates with GWPM 1410 obtain the information needed for a tournament. One example of the information needed for a tournament is "pool" information, a player's $RC_1$ 127 contribution is donated to a "pool". The nature of the pool is help fund prizes and awards in the tournaments provided for the hybrid game.

In accordance with these embodiments, the hybrid game ecosystem associates each player with the amount of RC 1581 that the player has contributed to the tournament prize pool (via $RC_1$), and transfers the credits associated with a particular player to a prize pool for a particular tournament when a particular player is assigned to that particular tournament. A player is added to a particular tournament in the following manner in accordance with these embodiments. GWPM 1410 provides information to the GWTM 1412 about the available players eligible for a tournament, whether an eligible and an available player elects to join a tournament, and other such logical tournament hosting and management functions. When a player is added to a tournament at least following three factors are provided by the GWPM 1410 to the GWTM 1412: (a) the transfer of funds which would be the integral of the total RC 1581 contributed (via $RC_1$) by the particular player, (b) the transfer of the appropriate species of GWC (or UGWC) 1583, and (c) a packet of player information 1551 regarding the relationship between the GWC and RC being transferred (see example GWTM formulae below) as well as information profiling the player's skills and performance profile.

The GWTM 1412 includes three possible elements: (a) a tournament distribution module 1565 which operates GWTM function [*f*9] 1570 to distribute RC 1581, GWC 1583 and contributed casino marketing credits ("cCMC") 1552, (b) an RTP Sampling module 1568, and a (c) Audit Module 1569. In accordance with embodiments of the invention, the GWTM 1412 provides the following core functions: creating and organizing tournaments based on controls specified by a casino operator (and/or regulatory authorities); sorting players and credits into created tournaments; transferring players and credits into the proper tournaments; conducting the tournaments; awarding winners of tournaments prizes and crediting associated with those tournaments; logging persistent accounting data associated with the tournaments and performing accounting functions; monitoring of prizes and awards issued during tournaments.

In accordance with embodiments of the invention, the GWTM 1412 creates and organizes tournaments based on controls specified by a casino operator (and/or regulatory authorities) in the following manner. The GWTM 1412 receives tournament parameters 1554 from a casino operator (and/or regulatory authorities), and establishes a threshold GWC which is to be collected from each player to enter the tournament. The GWTM 1412 communicates with the GWPM 1410 to determine classes of players in a tournament based on player profiles of the players entered and/or eligible to participate in a tournament. The GWTM 1412 analyzes the amount of RC 1581 contributed by each class of players to the prize pool in the tournament, the cCMC 1553 target controls and the amount of cCMC 1552 that will be contributed. Based on this analysis, the GWTM 1412 determines the prize(s) that will be awarded in the tournament by issuing the aggregate of RC 1581 and cCMC 1552 to the winners. Typically, cCMC 1552 are added to the pool of the tournament by casino operators to fund or enrich tournaments to make them more desirable to all players or select classes of players. The GWTM also communicates with the GWPM 1410 to determine players 1580 who are online (playing the hybrid gambling game), fit a certain class which the operator wishes to invite into a particular tournament(s), and have sufficient GWC (or UGWC) to make the particular players candidates to enter one or more particular tournaments. Based on these determinations, the GWTM 1412 provides a request to GWPM 1410 to invite a candidate player to join the tournament. (The GWPM 1410 then presumably extends the invitation to the candidate along with potential prizes, and flags each willing participant to the GWTM 1412 for addition into a tournament).

In accordance with some embodiments, the GWTM 1412 sorts players and credits into created tournament by providing the following functional steps. The GWTM 1412 identifies and collects funds for the tournament. The collection of funds from a player may be completed by transferring of all or a portion of the total RC 1581 from the player that are to be contributed to the prize pool. Methods for identifying the amount of RC 1581 from each to allocate to the tournament may include, but are not limited to: (a) an index, based upon class of the player, of the GWC which will be collected from the player when the player joins the tournament, (b) a fixed percentage of the total RC contributed by all players to tournament prize pools, (c) a percentage formed by determining the percentage of RC that each player of a particular class of players has to contribute to the overall prize pool, (d) a percentage formed by determining the percentage of RC that each of the participating players have contributed to the overall tournament prize pool. The GWTM 1412 also collects the specified amount of GWC 1583 (or UGWC) from the player account of each participating player that is required to for the player to enter a particular tournament. The cCMC 1552 for use in the tournament as determined by the cCMC target tournament controls 1553 is also collected by the GWTM 1412. The participating players are also sorted into a particular tournament groups 1566 via the operation of tournament distribution module 1565 operating GWTM function [*f*9] 1570 in GTWM 1412.

In accordance with some embodiments of the invention, the GTWM 1412 conducts the tournaments by releasing the tournament to execute. Each player then plays the hybrid game on their own device 1401. One skilled in the art will note that the actual operations of the tournament mode gameplay of the hybrid game on device 1401 may be controlled by the GWTM 1412 or some other system.

When play of the hybrid game for the tournament is completed by each of the players in a tournament, the GWTM 1412 determines the winners of the tournament, awards prizes for the tournament, and credits each player account associated with the awards in the tournament. These steps may include the GWTM 1412 distributing the total prize pool associated with the particular tournament to the appropriate players according to the tournament parameters 1554. If the tournament is comprised of several rounds, the winners 1577 of a tournament 1566 are recursively entered into the tournaments 1566 as participants 1576 until a final set of winners 1577 are determined.

In accordance with some embodiments, the provision of the core function the logging persistent accounting data associated with the tournaments and performing accounting functions by GTWM 1412 includes storing data associated with tournaments, credits transferred in, credits awarded out in prizes, identify of players in the tournaments, winners of tournaments, and other data associated with tournaments and communicating each portion of the data to appropriate systems which may be coupled to the GWTM 1412. In some the embodiments the provision of the core function of monitoring of prizes and awards issued during tournaments by the GWTM 1412 is performed by sampling the total of prizes and awards issued in the tournament and comparing the total against the amount of RC 1581 contributed (via $RC_1$), by the participating players in the tournament to validate and/or make necessary adjustments to prizes and awards via GWTM function [ƒ9] 1570, or other mechanisms, to insure a predetermined return to player ("RTP") proposition.

One skilled in the art will note that all instances of credits (i.e. $RC_0$ 122, $RC_1$ 127, RC 981, cCMC 152) used in the hybrid game ecosystem shown in FIG. 15 could be replaced with virtual credits (or currency), allowing the FIG. 15 system to become a play for free model. In this case, a player would either be given or purchase virtual play credits, which would be used by the hybrid game, contributions of virtual credits made to GWPM 110, along with cCMC 152 provided by the casino operator, which in turn would be distributed as described above as prizes and awards of virtual currency, virtual credits or prizes and awards via tournaments by the GWTM 112.

On skilled in the art will also note that the direction of data flow shown in FIG. 15 is meant to convey a logical flow of data primarily related to insuring a proper accounting of player contributed RC ($RC_1$) and GWC, and not necessarily to mean a unidirectional channel of communication. Indeed, it is anticipated that any such connections with the hybrid game ecosystem would be bi-directional, if at minimum to insure reliable and fault free delivery of transferred data.

Figure 16:
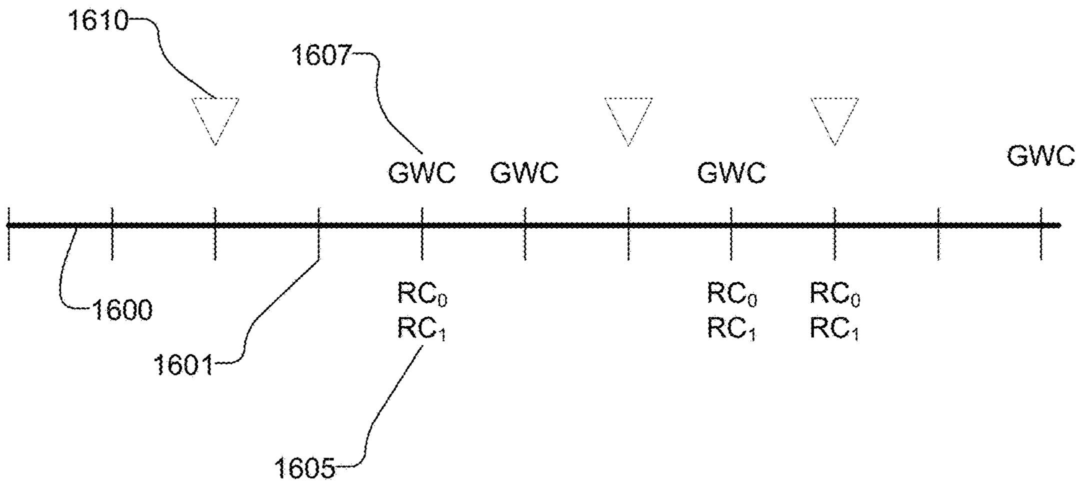
FIG. 16 illustrates a tracking record maintained for a hybrid game during tournament in accordance with embodiments of the invention.

A tracking record for the game session that allows various game events and actions to be recorded against a game progress reference in accordance with embodiments of the invention is shown in FIG. 16. The tracking record illustrated in FIG. 16 is generated within a HyG 1401 and called a HyG.seq. The HyG.seq.record frame 1600 is standard tick 1601 in the context of the hybrid game. A standard tick may be one of a number of possible metering methods, such as, but not limited to, a period of game virtual time, a period of real time, game actions taken, wagers executed in the hybrid game, levels of the entertainment game, etc. Recorded against these ticks are events of interest in the hybrid game, such as RC wagered and contributed ($RC_0$, $RC_1$) 1605; GWC earned or expended 1607; or special events 1610 (e.g. use of a special object such as a potion, a weapon, a force field or armor, or a tool of some kind). A number of other game play metrics may be recorded against the HyG.seq.record frame without departing from these embodiments. The purpose of recording these metrics are to make the metrics available at a later time for use by the hybrid game, the GWPM 1410 and/or the GWTM 1412 in determining any number of various factors about the game play session, such as but not limited to: a total amount of $RC_1$ contributed to the tournament prize pool; the efficiency in which a player generates GWC as a function of RC wagered (expressed as "GWC|RC"); the effect of special objects on the players GWC|RC efficiency; the effect of other game events or factors on a player's GWC|RC efficiency; the skill of a player as measured by GWC earned vs. entertainment game actions taken (expressed as "GWC|game actions"); the presence of "cheats" operating within the entertainment game, authorized or not. One skilled in the art will recognize that the metrics and events that may be recorded in a HyG.seq.record can provide forensic data for analyzing and characterizing a player and a player's performance in the particular game during the session that the HyG.seq.record covers.

Figure 17A:
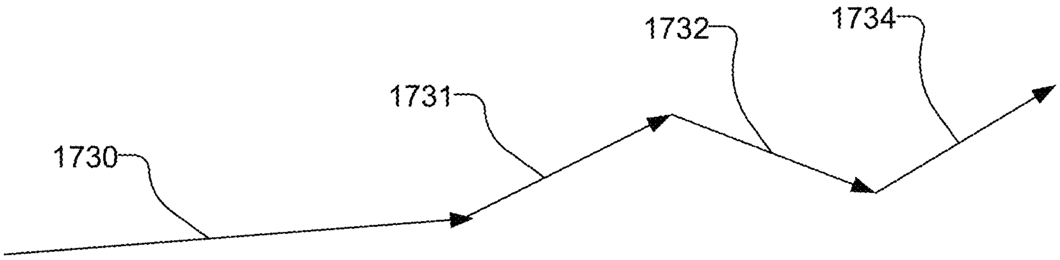
FIGS. 17A and 17B illustrate an alternative tracking record maintained a hybrid game during tournament play in accordance with embodiments of the invention.
Figure 17B:
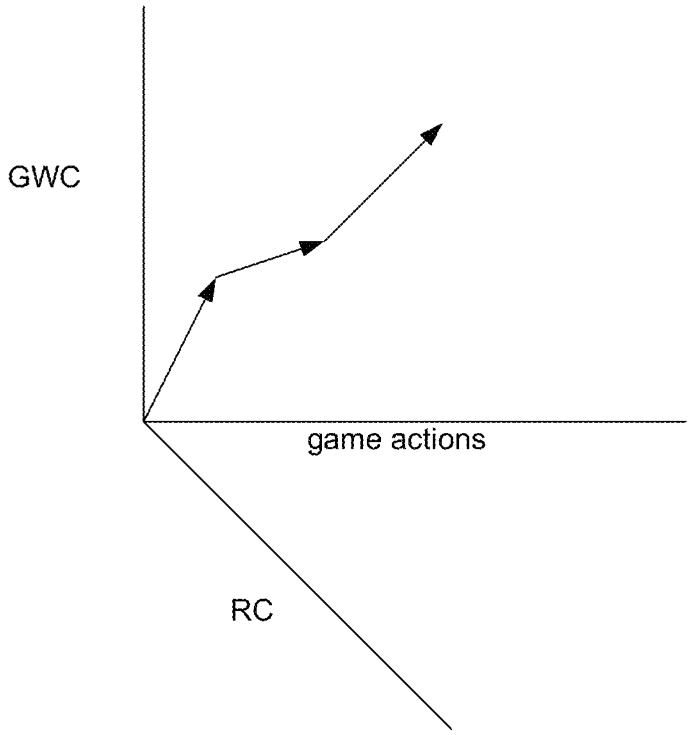

An alternate tracking record for the game session using a vectoring scheme that allows various game events and actions to be recorded against a game progress reference in accordance with some embodiments of the invention is shown in FIG. 17. In FIG. 17, each of the numbered vectors 1730-1734 (along with vector math) are used to record various characteristics of the gameplay session. Each axis used for vector coordinates would be some metric of game play which the system wishes to record, and as such, vectors under this approach may be 2, 3 or multi-dimensional in nature. For instance, a vector could record GWC|RC and GWC|game actions as is illustrated in the figure. The advantage of such an approach would be that only the significant changes outside of a consistent slope (based on the plotted average of data points) would be recorded, potentially significantly reducing data storage. Additionally, application of Euclidian geometry to such data could speed analysis related to ranking, classing and bracket players, and looking for cheats.

A vectoring scheme is also useful in determining the amount of RC (via $RC_1$) players of a player class will theoretically contribute to the tournament price pool. The analysis looks at various vector points and data in performing the analysis by Euclidean geometry such as: GWC, RC, GWC|RC, GWC|game actions. Vectors could encapsulate complete game sessions, or sections thereof.

The vectoring scheme of FIG. 17 also applies appropriate weighting to each game session, as it relates to the play history of the hybrid game. As shown in FIG. 17, if the initial play of the game is represented by vector 1730, where the x-axis represents game action (GA) and the y-axis represents GWC, then by placing the vector 1731, which would represent a subsequent wager or play session, at the tail of vector 230, the GWC gained or lost during a period of game play are weighted against both past and potential future play. In the example shown, the net vector of play sessions 1730, 1731, 1732 and 1734, are represented by a single vector, with a tail at the tail of 1730, and the tip at the tip of vector 1734. This method would provide a single vector representation of the net GWC vs. GWA. Any new play beyond this point is represented by a vector beginning at the tip of vector 234. Furthermore, as also shown in FIG. 17, additional data may be included, and recorded, such as RC, shown in the three dimensional illustration. Additional information may also be stored to include, but not limited to, additional information including play time, career or lifetime GWC earned, special objects or powers earned in the GW.

The GWTM Function [F9]

Figure 18:
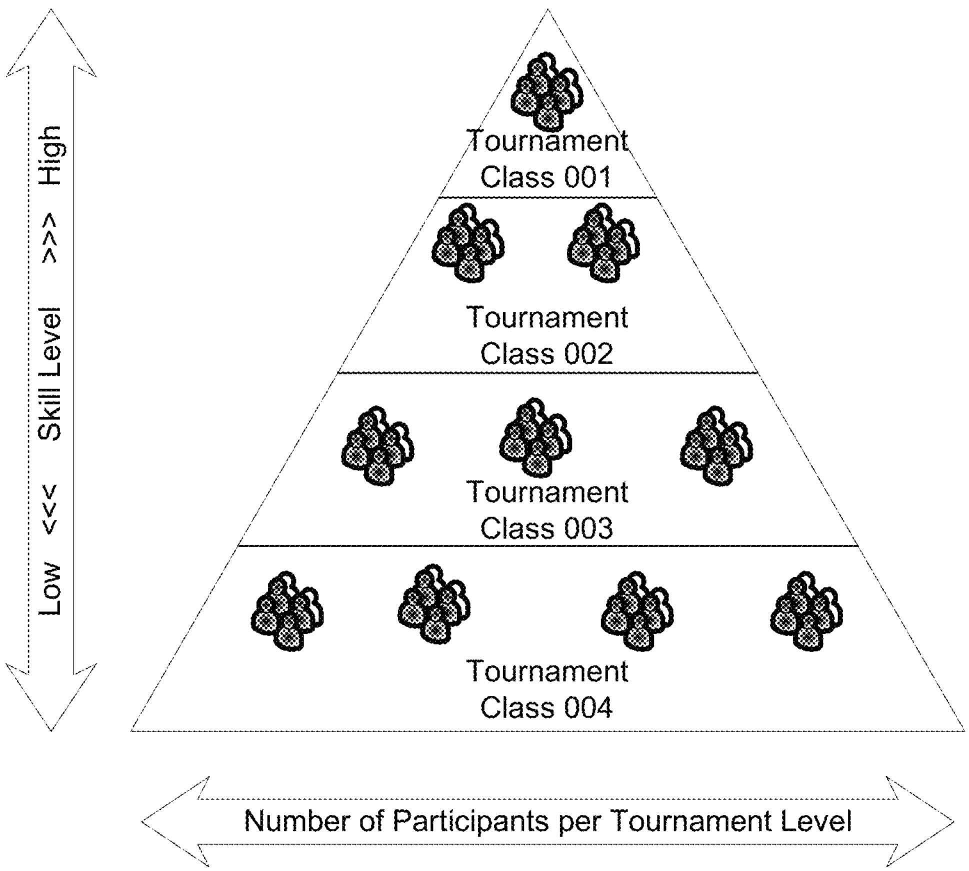
FIG. 18 illustrates a conceptual diagram representing a distribution of player skill for a hybrid game for tournament purposes in accordance with embodiments of the invention.

As discussed above with reference to FIG. 15, a tournament distribution module 1565 of GWTM 1412 performs GWTM function [ƒ9] 1570 to distribute RC 1581, GWC 1583 and contributed casino marketing credits ("cCMC") 1552 to the appropriate tournaments. One skilled in the art will note that it is expected that a highly skilled player, with respect to a given ESE, will accumulate GWC per RC 1581 wagered and/or Game Action (GA), at a higher rate than a less skilled player. This is the primary basis from which skill level and ultimately tournament class or banding can be determined. As represented in FIG. 18, it would also be expected that the top tournament class would be made up of a relatively small number of elite players, compared to less skilled classes. It also would be expected that the less skilled tournament classes would have a larger player pool, consisting of players that contributed a larger amount of RC 1581, in an effort to earn the GWC 1583 required to enter a specific tournament. As a result, the lower class consisting of a larger number of players, having a higher RC/GWC ratio, than the more skilled players, will have a larger RC prize pool, than the higher classes of players. In order to draw in the more skilled, or "elite" players into a tournament, the casino could include marketing dollars 1552, in the form of RC or other prizes for the higher level tournament class bands. In doing so, the casino is attempting to attract top players, which would in turn attract lesser skilled players, to compete in the same tournaments as the top players.

The most direct way to determine the general skill level of a player is to calculate the GWC earned vs. GA. The following table demonstrates this point:

| Player | GA | GWC | GWC/GA | sum(RC1) |
|---|---|---|---|---|
| 1 | 400 | 4000 | 10 | 50 |
| 2 | 250 | 5000 | 20 | 40 |
| 3 | 100 | 3000 | 30 | 20 |
| 4 | 1000 | 3000 | 3 | 100 |

Utilizing the above mathematical model, the GWTM System can sort the players into appropriate tournament class bands. The criteria for entering a tournament and determining the class would be set by the casino and interpreted by the GWTM System. This would include, the minimum number or buy-in of GWC 1583, to enter a tournament, as well as the class banding criteria determined by function [*f*9] 1570.

If a player meets the minimum entry requirement or buy-in, they will be invited to enter a tournament, at the time that a player chooses to enter the tournament, the GWTM 1412 I deducts the required amount of GWCA 1583 from the player's account as an entry fee, the balance of the GWC will remain in the player's account. Also, at the time of buy-in, the appropriate amount of $RC_1$ 1581 will be transferred from the players GWPM 1510 account, to the tournament prize pool. The appropriate amount of $RC_1$ contributed to the prize pool could be a function of GWC used to enter the prize pool vs. total GWC that the player has in their personal account. As an example, in the case of Player 2, above, if the total amount of GWC to enter the tournament is set at 2500, the player needs only expend 50% of the player's available GWC, which is 5000. In this case, 50% of their available $RC_1$ or 20 units, with the balance of 20 units remaining in their personal account for possible inclusion in a future tournament. Class banding could be set by strictly by GWC/GA ratio for example:

Class 001: GWC/GA<10;

Class 002: 10<=GWC/GA<20;

Class 003: 20<=GWC/GA<30; and

Class 004: 30<=GWC/GA

Another option is that the class banding function could use a bell curve type system. In a bell curve system, the classes are determined by percentage of players in a portion of the curve. For example, a top tournament class including only the highest ranking players may include the top 5% of entrants, the second tournament class includes the next 10% of entrants, a third class includes the next 25% entrants and the last class includes the remaining 60% of entrants. The percentages and number of classes discussed are only used to show an example of how the tournament classes might be set-up. The total prize pool for each class of the tournament would be based on the total $RC_1$ wagered by each participant in a given tournament class, plus cCMC, based upon the cCMC target controls 1553. So the total prize allocation for a specific tournament class would be: Sum(RC1) for Tournament Class n+cCMC for Tournament Class n=Total Prize Allocation for Tournament Class n. The cCMC could be cash, gifts, prizes or other considerations, as determined by the casino. In any case, the total number of participants in a specific class, as well as the total RC contribution to that class will not be known, until all participants have entered the tournament, and tournament entry has been closed. At this time, the function [f9] incorporates all criteria, including, but not limited to, total number of participants in tournament; total prize pool; RC and cCMC contributions; total number of classes; number of participants in each class; and prize pool for each class. Once this is completed, information such as projected prizes, for the various classes is determined and communicated. Once this takes place, tournament players may be released and tournament play of the entertainment game may begin, with or without the wagering aspect of the hybrid game.

Many other types of methods for managing and analyzing data in the gambling hybrid ecosystem are possible, such as using derivatives, differential equations, matrices math and other methods for creating curves and surfaces in order to fully characterize the player, the play session, determining total financial contribution and a number of other useful metrics related to the play session.

Figure 19:
FIG. 19 illustrating a flow diagram of processes performed by a Game World engine to provide a tournament for hybrid games in accordance with embodiments of the invention.

An overview of the process for providing tournament by a GWE that includes the GWE of the HyG 1401, the GWPM 1410, GWCE 1411, and the GWTM 1412 is shown in FIG. 19. In process 1900, the GWE determines a set of players of a hybrid game that are eligible to participate in a tournament (1905). The GWE then provides an invitation to each of the eligible players (1910). The invitations may be provided through the ESE of the hybrid games being played by the players which presents the invitation to the player through the player interface. The GWE receives acceptances of the invitations from the invited players and determines the participants in the tournament from the acceptances (1915). In accordance with some embodiments, the acceptances are received from the ESE of the hybrid games being played by the players. The ESE receives an input indicating the acceptance and provides the acceptance to the GWE.

The determined participants may then be separated into classes for tournament play (1920). The prize pool for the tournament and/or for each class in the tournament is determined (1925). As discussed above, the prize pool and individual prizes in the prize pool for the tournament and each class in the tournament may be based upon the number of participants and/or amount of GWC, RWC, or VRWC provided by each player.

The GWE then signals the start tournament play (1930). In accordance with some embodiments of the invention, the signal may be provided to the ESE to begin recording the game play for use in determining the results of the tournament. The GWE then receives updates about the gameplay or game session metrics of each player of the hybrid game from the ESEs of the hybrid gambling games being played (1935). The updates of the gameplay of the players are then used to determine the results of the tournament and to award the prizes in the prize pool of the tournament and/or each class of players to the participants (1940). The player records of the participants are updated to reflect the contributions to the prize pool and/or the prizes awarded (1945).

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description.

What is claimed is:

1. A tournament system, comprising:

a plurality of network distributed processing systems, each network distributed processing system comprising:

a server connected to a controller via a communication link, wherein the server is constructed to determine an outcome of a wagering event;

a mobile computing device connected to the controller by a network, wherein the mobile computing device is constructed to: execute an entertainment game;

generate a visual representation of the entertainment game;

provide an entertainment game outcome on the basis of a player's utilization of an entertainment game element during the player's play of the entertainment game;

generate entertainment game metrics;

receive from the controller via the network the outcome of the wagering event; and generate a visual representation of the outcome of the wagering event; and the controller connected to the mobile computing device by the network and connected to the server by the communication link, wherein the controller is constructed to:

receive from the mobile computing device by the network, the entertainment game outcome and information about the player's utilization of the entertainment game element;

receive from the mobile computing device by the network, the entertainment game metrics;

determine a wagering event based on the player's utilization of the entertainment game element;

request from the server via the communication link, the outcome for the wagering event; and receive from the server via the communication link, the outcome of the wagering event; and a tournament manager coupled to the plurality of network distributed processing systems, the tournament manager constructed to:

determine a set of players associated with the plurality of network distributed processing systems, the set of players participating in a tournament;

determine a set of classes of players in the set of players participating in the tournament using the entertainment game metrics;

determine a prize pool of the tournament that includes a set of individual prizes;

receive updates from each of the plurality of network distributed processing systems associated with the set of players participating in the tournament;

determine a distribution of the individual prizes to the set of players participating in the tournament based on the updates;

distribute the individual prizes; and update player records of each player of the set of players participating in the tournament based on participation in the tournament.

2. The tournament system of claim 1, wherein the tournament manager is further constructed to determine a set of players eligible for the tournament.

3. The tournament system of claim 2, wherein the tournament manager is further constructed to:

provide an invitation to each player in the set of players determined to be eligible for the tournament; and receive an acceptance of the invitation from each player in the set of eligible players that want to participate in the tournament, wherein an inclusion of a player in the set of players participating in the tournament is based on receiving the acceptance of the invitation.

4. The tournament system of claim 1, wherein the tournament manager is further constructed to:

determine a prize pool of individual prizes for each class in the set of classes of players of the tournament; and determine a winner of each individual prize in the prize pool in each class from the players in each class.

5. The tournament system of claim 1, wherein the update includes session metrics.

6. The tournament system of claim 1, wherein the update is recorded using a vector scheme.

* * * * *